UNITED STATES PATENT OFFICE.

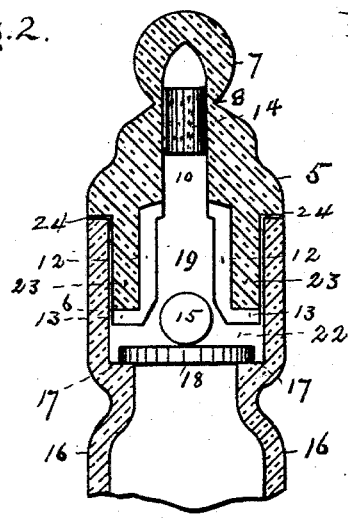

LEON J. HOUZE, OF HARTFORD CITY, INDIANA.

NON-REFILLABLE BOTTLE.

SPECIFICATION forming part of Letters Patent No. 593,220, dated November 9, 1897.

Application filed March 20, 1897. Serial No. 628,433. (No model.)

*To all whom it may concern:*

Be it known that I, LEON J. HOUZE, a citizen of the United States, residing at Hartford City, in the county of Blackford and State of Indiana, have invented certain new and useful Improvements in Non-Refillable Bottles; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in non-refillable bottles; and its object is to provide an improved antirefilling device for bottles and like vessels; and the invention consists in the construction and novel combination of parts hereinafter described, pointed out in the appended claims, and illustrated in the accompanying drawings, in which—

Figure 1 is a vertical section of my preferred form of the entire device. Fig. 2 is a sectional view of another form. Fig. 3 is a sectional view of the neck of a common bottle provided with a valve-seat with the closure attached; and Fig. 4 is a cross-section of Fig. 1, taken on the line $x\,x$, showing the interior of the closure.

The closure or stopper 5 is a tube of glass provided with a broad base 6 at its lower end to correspond to the valve-seat 17 on the neck 16 of the bottle or vessel. The diameter of the tube of the closure is contracted into a small tube 10 at its upper end, and a short distance above the contraction the closure 5 is provided with a break-off cap-piece, preferably a ball 7, of glass, into which the smaller tube 10 extends, as shown. The walls of the tube are restricted at the place of juncture 8 of the break-off cap-piece or ball 7 with the closure 5, so as to form a very thin wall at that place compared with the thickness of the walls above and below it.

I have had a lifelong experience in the manufacture of glass and glassware. I have discovered that if two hollow pieces of glass be attached to each other by a very thin wall forming a juncture between them one can be broken from the other with a clear smooth fracture and without any shattered glass— that is, there will be no fine particles or pieces of glass broken off in the process, which may fall into the opening and be poured out with the liquid, but there will be one complete fracture with clean lines of breakage.

In the device shown the ball should be broken off with a blow given in an upward direction to insure such clear breakage, and for this the ball is the preferable form of a break-off piece. If the blow is at right angles or downward, there may be some slight shattering, especially if the walls at the juncture are too thick. To prevent, when so broken, such shattering from affecting the liquid, a cork 14 is inserted in the smaller tube 10 of the closure 5 and extended partly into the ball 7. If then any fragments of glass are broken off, the cork 14 excludes them from getting into the orifice and they can be brushed off before taking the cork out. The closure 5, provided with such break-off piece or ball 7 and means to unite it inseparably with the neck 16 of a bottle or other vessel, would make a non-refillable device of itself, because once the ball 7 was broken off it could not be replaced, and if refilled the bottle would have to be stoppered in some other way, thereby giving evidence that it was not an original package; but where bottles or vessels are opened in the course of trade and other vessels are filled from it further devices are required to prevent the retail dealer from refilling with a different or inferior article. For such purpose the closure 5 is provided with the broad base 6 and the diameter of the tube 9 contracted at its upper end into a smaller tube 10, as above described, for the purpose of holding the sliding ball 15 within the closure 5. Vertical ribs 12 are formed on the interior of the larger tube 9 of the closure 5, extending from its lower end up to the contracted part, forming grooves 25 for the freer passage of the liquid. Horizontal ribs 13 are also formed on the base 6 of the closure 5, their inner ends coinciding with the vertical ribs 12, so as to form continuous grooves. I have illustrated only three such ribs, but it is obvious that the number may be increased, if desired, thereby making the grooves smaller. A sliding weight, preferably in the form of a ball 15, fits in this larger tube and is guided by the vertical ribs 12 and held from passing out by the shoulder 11, formed by restricting the diameter of the tube at or near its upper end, the purpose of contracting the larger tube 9 of the closure at or near its upper end being solely to prevent the sliding weight or ball 15 from passing out or being removed through that end of the closure. It is obvious that other constructions could be made with like effect. I therefore do not confine myself to the particular construction of a smaller tube at the upper end of the closure, but illustrate it as the preferable one for such purpose. The functions of the sliding weight or ball 15 are to hold down the valve when in normal position and to interpose an obstruction to any interference with the disk valve 18 from without, such as trying to lift it by an inserted wire. Two or more such weights or balls may be used, if desired, and the form of the weight may be varied without departing from my invention.

The neck 16 of the bottle or vessel has its upper end ground or suitably prepared to form a flat valve-seat 17. Upon this seat a disk valve 18, preferably of glass, is fitted by grinding or otherwise, and is made preferably a little less in diameter than the seat to permit a freer passage of liquid when the valve is raised, but not so much as to uncover the opening of the neck at any point if not placed centrally, as it may be by accident or otherwise.

Means are provided to attach the closure 5 to the neck 16 and to provide a valve-chamber 22 between the base 6 of the closure and the disk valve 18 when in place to permit the valve 18 to have a limited motion therein. This chamber 22 is made of larger sectional area than that of the tube for purposes hereinafter explained. The first and preferable construction is shown in Fig. 1, and consists in contracting the neck 16 of the bottle or vessel into a short straight cylindrical portion provided with a shoulder 20—that is, the upper part of the neck is a rabbeted end 19—and I also provide a cylindrical extension 21 of the closure 5 integrally formed, adapted in interior diameter to fit over said rabbeted end 19 of the neck, with its lower end resting on said shoulder 20 and adapted to hold the base 6 of the closure a short distance above the disk valve 18 to form the valve-chamber 22. The joining parts of the neck of the bottle and such cylindrical extension 21 are preferably made as shown, and they are inseparably united, preferably by a non-soluble cement, so that they cannot be separated without breaking the parts.

It is obvious that the rabbeting of the neck of the bottle is not the only construction for the purpose, for the cylindrical extension 21 can be secured to the neck 16 of any bottle by means of sufficient quantity of cement without a close-fitting rabbeted end 19, as illustrated in Fig. 3, but the rabbeting, as described, is a much better construction for the purpose of secure and perfect holding of the closure. If, therefore, an ordinary bottle is used, all that is necessary is to grind the end of the neck to form the valve-seat 17 for the disk valve 18 and fill the space between the neck and the inclosing cylindrical extension 21 with suitable cement 26. (See Fig. 3.) The other construction is shown in Fig. 2. The essential difference is that the cylindrical extension 21 is attached to the neck 16 of the bottle and the rabbeted part is formed on the lower part of the closure-cap, which fits like a stopper into the cylindrical extension. The shoulder of the rabbeted part limits the distance apart of the base of the closure from the top of the disk valve, forming the valve-chamber 22. Substantially the parts are reversed, so to speak, but the functions are exactly alike in both constructions.

All of the parts are made of glass except the cork 14, and therefore nothing is in contact with the liquid to be affected thereby or to impart anything to it.

It will readily be seen from the construction that if a wire be inserted through the closure 5 after the ball 7 is broken off it cannot be made to reach and operate the valve 18, so as to open it for filling, and that any attempt to fill the bottle will be prevented by the disk valve 18 closing the aperture. This readily appears when the bottle is held upright, but should it be inverted of course the ball and disk valve would drop down, thereby opening the neck of the bottle. If in such position it is placed downward into liquid, the liquid would flow up through the closure 5 into the valve-chamber 22 against the disk valve 18, forcing it upward against its seat 17.

By a well-known law in hydraulics the sectional area of the valve-chamber 22 being by construction much greater than the sectional area of the tube 9 of the closure the force of the upward flow is thereby largely increased in the valve-chamber, closing the disk valve more effectually and more perfectly, preventing the entrance of liquid up into the bottle. When held upright, the ball holds the valve with sufficient force to prevent the passage of liquids poured into the closure. It seems also that when the valve is on its seat any moisture between the two glass surfaces of the valve and seat aids in causing a hermetical sealing on the principle of thoroughly excluding the air and thereby utilizing its pressure to hold the valve in place.

Having thus described my invention, what I claim as new, and desire to secure by Letters Patent, is—

1. The combination of a vessel provided with a neck adapted to form a seat for a disk valve; a closure provided with a base corresponding to said valve-seat, a break-off ball at its upper end, the tube of the closure being of less diameter at or near its upper end, and the ball provided with a coinciding tube extending into but not through it, the closure and ball also being restricted at their place of juncture to form a thin wall; vertical ribs on the interior of the tube of the closure forming grooves extending from its lower end up to its narrower part; horizontal ribs coinciding with the vertical ribs on the base of the closure forming grooves; a disk valve for the valve-seat of the neck; means to attach the closure to the neck permanently and to provide a chamber for the disk valve adapted to permit a limited movement of the disk valve; sliding weights within the closure, adapted to be guided by its vertical ribs; and a cork placed in the upper end of the closure and extending into the tube part of the break-off ball.

2. The combination of a vessel provided with a neck adapted to form a seat for the disk valve; a closure provided with a base corresponding to said valve-seat, and provided with a break-off cap or ball at its upper end, the closure and ball being restricted at their place of juncture to form a thin wall for breakage; ribs on the interior of the closure forming grooves for the passage of the liquid from the valve-chamber; a disk valve for the valve-seat of the neck; means to attach the closure to the neck permanently and to provide a valve-chamber for the disk valve; a sliding weight or ball within the closure adapted to be guided by its vertical ribs, and means to prevent the removal of the sliding weight or ball through the upper end of the closure.

3. In a non-refillable bottle or vessel, a neck adapted to form a seat for a disk valve; a disk valve for said seat; a glass closure-cap provided with a base corresponding to said valve-seat; a break-off cap-piece or ball on its upper end connected by a thin wall, the tube of the closure provided with means to retain a sliding weight; and also with ribs forming grooves for the passage of the liquid from the valve-chamber; a weight or ball adapted to slide within the closure; means to attach the closure-cap to the neck inseparably and to provide a valve-chamber for the disk valve.

4. The combination of a bottle or vessel provided with a neck adapted to form a seat for the disk valve; a disk valve for said valve-seat; a closure-cap provided with a base corresponding to said valve-seat; also with a break-off cap-piece or ball on its upper end connected by a thin wall, and also provided with a tube of larger diameter at its lower end and of smaller diameter at the upper end of the closure, and also provided with ribs on its base extending into the interior of the larger tube, forming grooves for the passage of liquid and guides for a sliding weight or ball; a sliding weight or ball adapted to move in the larger tube, and be retained therein by the contracted walls of the smaller tube in the upper end of the closure; a cylindrical extension integrally formed on the lower end of the closure adapted to inclose the neck and hold the base of the closure a short distance above the disk valve to form a valve-chamber; and means to inseparably attach the cylindrical extension to the neck of the bottle or vessel.

In testimony whereof I affix my signature in presence of two witnesses.

LEON J. HOUZE.

Witnesses:
G. B. HUSTON,
H. C. HARTMAN.